Aug. 25, 1959      AN WANG      2,901,637
ANTI-COINCIDENCE CIRCUIT
Filed April 13, 1955
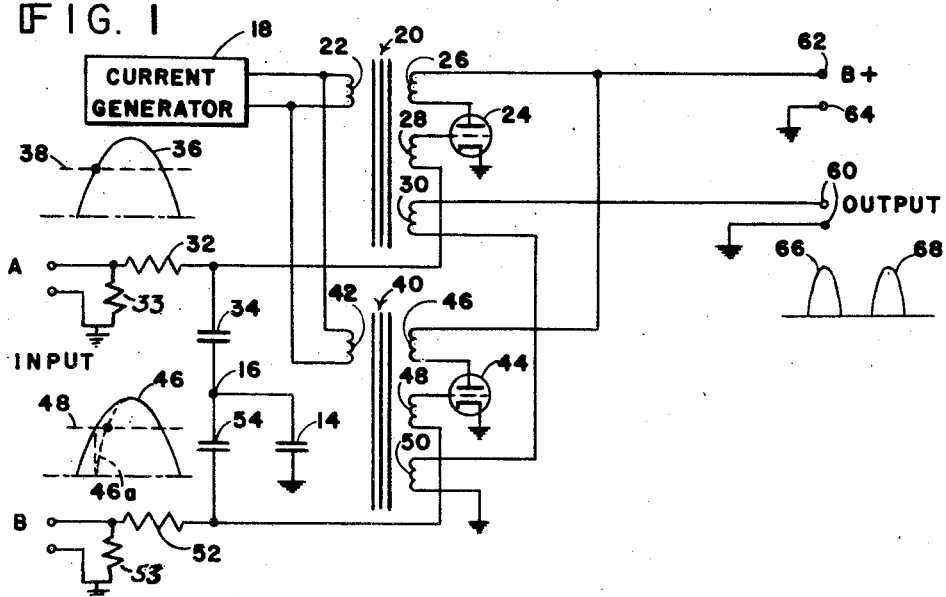
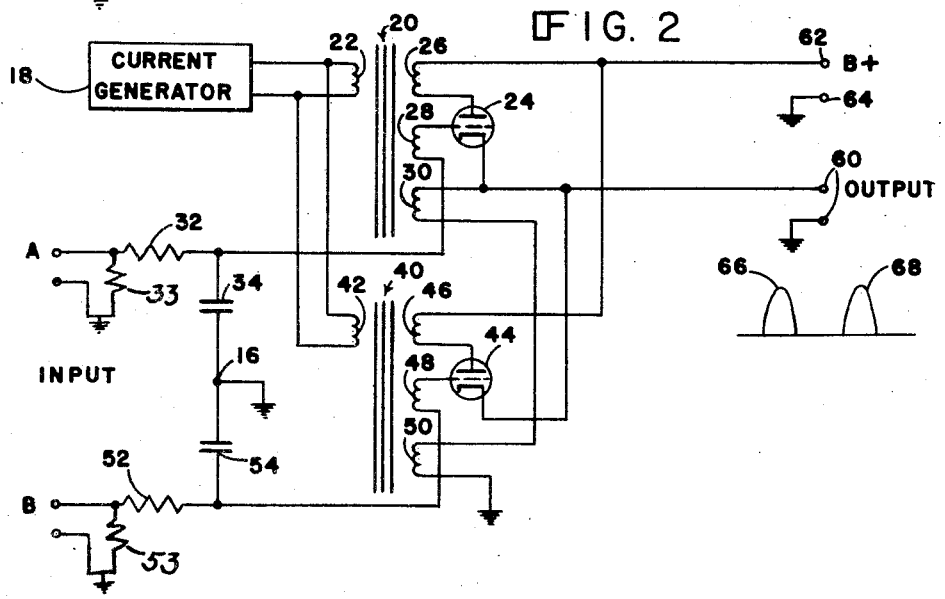
INVENTOR.
AN WANG

2,901,637

ANTI-COINCIDENCE CIRCUIT

An Wang, Belmont, Mass.

Application April 13, 1955, Serial No. 501,145

4 Claims. (Cl. 307—88)

This invention relates to pulse relaying networks and particularly to networks of the type wherein signal pulses from two or more input channels are accumulated for retransmission by way of a single output channel.

In certain electrical systems employing pulse circuitry, as in the case of counting systems, for example, it is necessary to accumulate signal pulses representative of counts from various sources and to provide in a single output channel a series of pulses corresponding to the total count. One of the difficulties encountered with such a system is that, on occasion, pulses from two or more sources may occur simultaneously so that unless special provisions are made, only a single pulse will appear in the output channel rather than a pair of consecutive pulses as is required to accurately represent the total count. Accordingly, it is an object of this invention to provide a relatively simple and reliable pulse relaying or transponding network of the above-described type adapted to reproduce in consecutive form, pulses occurring simultaneously.

Briefly, this object is achieved according to the present invention by use of a trigger circuit including a triode electron discharge device or equivalent transistor and a saturable transformer for each signal input channel, and circuit means interconnecting the various trigger circuits to maintain all but a conducting one of the triodes nonconductive for a brief interval corresponding to the duration of a single output pulse. Each of the saturable transformers has a pair of input windings, one of which is connected in the anode circuit of its associated triode, and an output winding connected in the grid circuit to provide positive feedback. The hysteresis characteristics of the magnetic material used in the core of the transformer should be such that the residual magnetic flux density (Br) be at least 0.4–0.5, and preferably greater than 0.8, and that the knees of the hysteresis curve be as square as possible. Magnetic materials such as "Deltamax" (a nickel-iron alloy) or a ferrite (ferromagnetic ceramic) are suitable.

When a signal input pulse is applied to one of the grid circuits, an increasing amount of anode current is caused to flow until saturation of the transformer takes place in one direction producing, in effect, a pulse of current in the anode circuit. At the same time, there is applied to the grid circuits of the other nonconducting triodes a negative voltage pulse to maintain them in a nonconductive state until the anode current pulse in the conducting triode has terminated. According to one embodiment of the invention, this negative voltage pulse is derived directly from the output winding in the grid circuit of the conducting triode. Alternatively, auxiliary output windings intercoupling the grid circuits of the various triodes are provided on the saturable transformers. In either case, after the anode current pulse has ceased, the negative voltage pulse disappears, permitting another one of the triodes to be triggered off by a second signal input pulse in like fashion to the first named triode even though the two signal input pulses arrive simultaneously. Finally there is provided a source of magnetizing current for the others of each pair of transformer input windings to saturate the cores to their initial state of residual magnetic flux density.

The novel features of this invention together with further objects and advantages thereof will become more readily apparent when considered in connection with the accompanying drawing in which:

Fig. 1 is a schematic diagram of the pulse relaying network according to this invention; and Fig. 2 is a schematic diagram of a modification of the pulse relaying network of Fig. 1.

Referring now to the drawing, wherein like elements are designated by the same reference characters, and more specifically to Fig. 1, it will be observed that for each pulse input channel, characterized by terminal pairs A and B, there is provided a trigger circuit including a triode electron device 24, 44 and a saturable core device or transformer 20, 40. Each of the transformers 20 and 40 has a pair of input windings 22, 26 and 42, 46, respectively, and a pair of output windings 28, 30 and 48, 50, respectively. One each of the terminals A and B is connected to a common junction point or ground as are the cathodes of the triodes 24 and 44. The others of the terminal pairs A and B are individually connected to the control grids of the triodes 24, 44 through series resistors 32, 52, respectively, and through the output windings 28, 48, respectively, of the saturable transformers 20 and 40. Shunt resistors 33, 53 are also provided between terminals A and B, respectively, and ground. Connected to the anodes of the triodes 24 and 44 through input windings 26 and 46, respectively, is the positive terminal 62 of a source of anode voltage, not shown, which has its negative terminal 64 connected to ground. In addition, there are provided capacitors 34 and 54 individually connected between a common junction point 16 and resistors 32, 52, respectively, and a capacitor 14 connected between junction point 16 and ground. Finally, a current generator 18 which serves as a source of magnetizing current is connected to input windings 22 and 42, the remaining windings on saturable transformers 20, and 40, namely output windings 30 and 50, respectively, being connected in series with one another across a pair of output terminals 60, one of which is grounded.

In operation an input signal in the form of a voltage pulse 36 appearing across terminals A is impressed across the grid circuit of triode 24 causing anode current to flow through input winding 26. As a result, there is induced across output winding 28 a positive grid voltage tending to increase the flow of anode current rapidly until transformer 20 becomes saturated and changes its state of residual magnetic flux density and the anode current ceases. In effect, therefore, an anode current pulse is produced which induces across output winding 30 an output voltage pulse shown at 66.

Assuming now that coincidental with the arrival of input pulse 36 at terminals A, a second input pulse 46 appears across terminals B, it will be necessary to prevent triode 44 from being triggered off until after output pulse 66 has terminated so as to accurately reproduce the count, that is to prevent pulse 36 from masking pulse 46 in the output of the network. To accomplish this result, there is caused to appear across capacitor 14 a highly negative voltage, owing to the presence of the induced voltage across winding 28, and the resulting flow of grid current through triode 24 charging up capacitors 14 and 34. Hence, junction point 16 assumes a potential substantially below ground so that pulse 46 is effectively shunted through resistor 52 and capacitor 54 placing the grid of triode 44 at ground potential momentarily, as shown by the dotted notch in pulse 46. Once capacitor 54 becomes charged, however, by current flow through shunt resistor 53, the voltage appearing between grid and cathode of triode 44 returns to the level it would have in the absence of an induced voltage across winding 28 as shown by line 48 through pulse 46. From this point on, the operation of the trigger circuit including triode 44 and transformer 40 is substantially the same as that described in connection with triode 24 and transformer 20. That is to say, pulse 46 causes anode current of rapidly increasing amount to flow in triode 44 until transformer 40 becomes saturated, inducing across winding 50 an output voltage pulse as shown at 68. Current generator 18 then serves to saturate the cores of transformers 20, 40 in their initial state of residual magnetic flux density preparatory to the arrival of additional incoming pulses. As is apparent, the magnetizing forces produced by the anode currents in windings 26 and 46 will greatly exceed those magnetizing forces produced by windings 22, 42 in order that the cores of transformers 20 and 40 may become properly saturated in response to succeeding pulses.

Referring now to Fig. 2, a modification of the above described pulse relaying network is illustrated. More particularly, output windings 30 and 50 are connected in series with one another between a junction point common to the cathodes of triodes 24, 44 and ground, the cathode junction also being connected to output terminal 60. Hence, it is seen that the cathodes are grounded through output windings 30 and 50 rather than being connected directly to ground as was the case in Fig. 1. Also, since the triodes 24 and 44 are effectively intercoupled by windings 30 and 50 in this case rather than windings 28 and 48, capacitor 14 becomes unnecessary and is omitted, the common junction 16 of the capacitors 34 and 54 being connected directly to ground. It will be apparent to those skilled in the art that in the modified embodiment of Fig. 2, a slightly different means is provided for cutting off one triode while the other is conducting. Thus, output pulse 66 produced by triode 24 in combination with transformer 20 is caused to appear not only at output terminal 60, but also between the cathode of triode 44 and ground. In effect, therefore, triode 44 is heavily cathode biased, preventing it from being triggered off by input pulse 46 until output pulse 66 has terminated. Once this has happened, the cathode bias will disappear so that triode 44 becomes conductive in like fashion to triode 24, thereby providing at output terminals 60, a second output pulse 68, representative of input pulse 46.

Although only two signal input pulse channels, characterized by terminals pairs A and B have been illustrated, for purposes of clarity in the drawing and in the description, it will be appreciated that any number of pulse input channels may be accommodated by providing additional trigger circuits, one for each input pulse channel, and interconnecting them as are the two trigger circuits illustrated. In such case, it will be possible to reproduce in a series simultaneous input pulses numbering more than two, provided of course that the input pulses are of sufficient duration relative to the width and spacing of the output pulses. The latter, in turn, will be determined by the values of the various circuit parameters utilized.

It will be apparent to those skilled in the art that still other modifications, not herein disclosed, but within the spirit and scope of the invention can be made. For example, rather than providing separate output windings on the saturable transformers to obtain the output pulses, these may be derived directly from the anode circuits if desired. Therefore, my invention should not be deemed to be limited to the precise embodiments illustrated, but rather by the scope of the appended claims.

I claim:

1. A pulse transponding network adapted to reproduce in a series pulses occurring simultaneously, said network comprising for each one of the pulse input channels, a triode electron discharge device having an anode circuit and a control grid circuit, means for impressing an input pulse on said control grid circuit to cause anode current to flow in said triode, a saturable core device having an input winding in said anode circuit and an output winding in said grid circuit to rapidly increase the flow of anode current in said triode to saturate said saturable core device in one direction and thereby provided an anode current pulse in response to said input pulse, circuit means intercoupling the control circuits of the triode electron devices and the saturable core devices to maintain all but the conducting one of the triodes in a nonconductive state until said anode current pulse has terminated, and magnetizing means to saturate the saturable core device to its initial state of magnetic flux density associated with the conducting one of the triodes after said anode current pulse has terminated.

2. A pulse transponding network according to claim 1 wherein said magnetizing means includes an auxiliary input winding on said saturable core device and a source of direct current coupled to said auxiliary input winding to produce a magnetizing force opposite in sense to the magnetizing force produced by the anode current in said first named input winding.

3. A pulse transponding network adapted to reproduce in a series voltage pulses occurring simultaneously, said network comprising for each one of the pulse input channels, an input circuit, a triode electron discharge device having an anode circuit and a control circuit, an anode voltage source, a saturable core device having a pair of input windings and an output winding, one of said input windings being coupled between said voltage source and said anode circuit and said output winding being coupled between said input circuit and said control grid circuit so that the current flowing in said anode circuit, as a result of an input pulse being impressed on said control grid circuit, is rapidly increased by an amount sufficient to saturate said saturable core device in one direction, thereby providing an anode current pulse in response to said input pulse, circuit means intercoupling the control grid circuits and the saturable core devices to maintain all but the conducting one of the triodes in a non-conductive state until said anode current pulse has terminated, and a direct current source of magnetizing current coupled to the other of said input windings to produce a magnetizing force opposite in sense to the magnetizing force produced by the anode current in said first named input winding to saturate said saturable core device in its initial state of magnetic flux density after said anode current pulse has terminated.

4. A pulse transponding network according to claim 3, wherein said circuit means includes auxiliary output windings on said saturable core devices connected in series with one another.

References Cited in the file of this patent
UNITED STATES PATENTS

| | | |
|---|---|---|
| 2,430,457 | Dimond | Nov. 11, 1947 |
| 2,591,406 | Carter et al. | Apr. 1, 1952 |
| 2,717,311 | Ogletree | Sept. 6, 1955 |
| 2,785,304 | Bruce et al. | Mar. 12, 1957 |
| 2,795,695 | Raynsford | June 11, 1957 |